US006047925A

United States Patent [19]

Rivera et al.

[11] Patent Number: 6,047,925

[45] Date of Patent: Apr. 11, 2000

[54] NOSE GEAR DOOR INTEGRAL COMPOSITE GLIDE SLOPE ANTENNA

[75] Inventors: Jose L. Rivera, Wichita, Kans.; William L. Rodman, Kirkland, Wash.; Donald B. Spencer, Pullman, Wash.; Brian P. Stapleton, Seattle, Wash.

[73] Assignee: The Boeing Company, Seattle, Wash.

[21] Appl. No.: 08/086,494

[22] Filed: Jul. 1, 1993

[51] Int. Cl.[7] ........ B64C 1/14

[52] U.S. Cl. ........ 244/129.4; 343/708

[58] Field of Search ........ 244/1 R, 129.1, 244/129.4, 129.3, 133, 100 R, 102 R; 343/708, 771, 705, 711–713, 772, 775, 789, 915, 912

[56] References Cited

U.S. PATENT DOCUMENTS

| | | | |
|---|---|---|---|
| 3,403,403 | 9/1968 | Howell | 343/708 |
| 3,662,392 | 5/1972 | Stapleton | 343/708 |
| 3,868,693 | 2/1975 | Young | 343/708 |
| 4,255,752 | 3/1981 | Noble et al. | 343/771 |
| 4,666,873 | 5/1987 | Morris et al. | 501/96 |
| 5,184,141 | 2/1993 | Connolly et al. | 343/708 |

OTHER PUBLICATIONS

Kuan et al, "Using Conducting Plastics" Aerospace Composite Materials pp. 31–34.

*Primary Examiner*—Galen L. Barefoot
*Attorney, Agent, or Firm*—Conrad O. Gardner

[57] ABSTRACT

A glide slope antenna for receiving information transmitted from the ground, including elevation guidance for the final approach. The glide slope antenna is integrated with the aft nose wheel well door and utilizes the inherent electrical properties associated with the graphite/epoxy composite door.

16 Claims, 2 Drawing Sheets

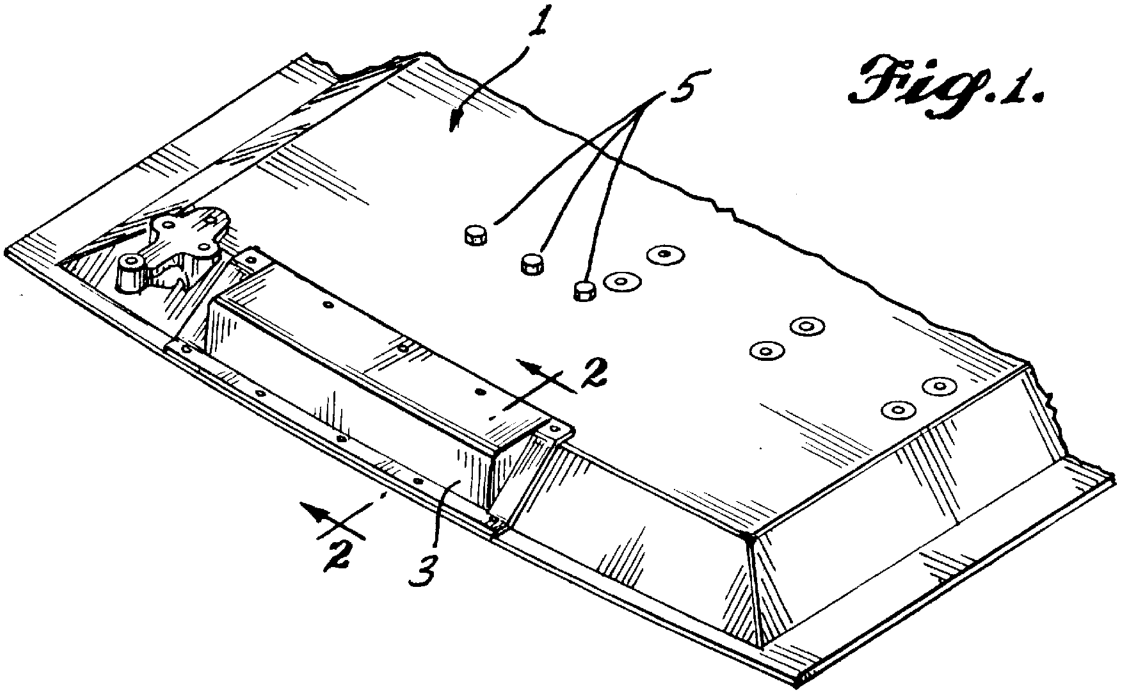
Fig. 1.
Fig. 2.
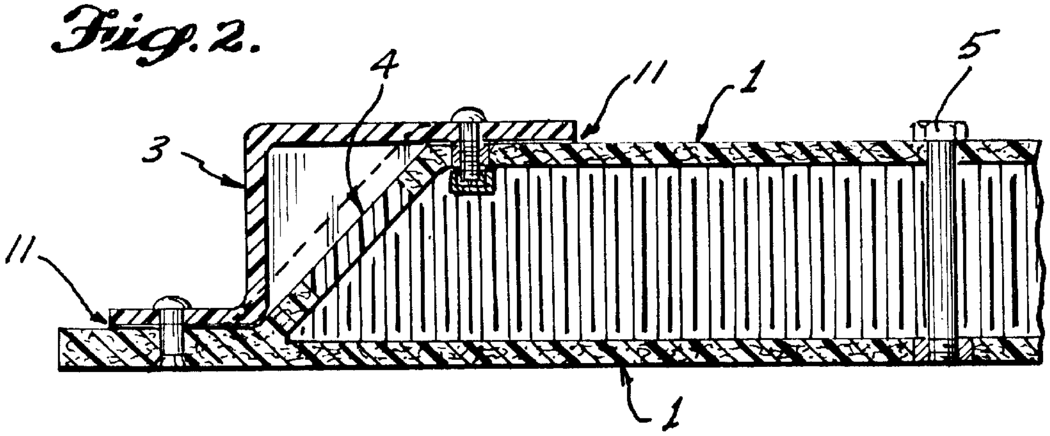
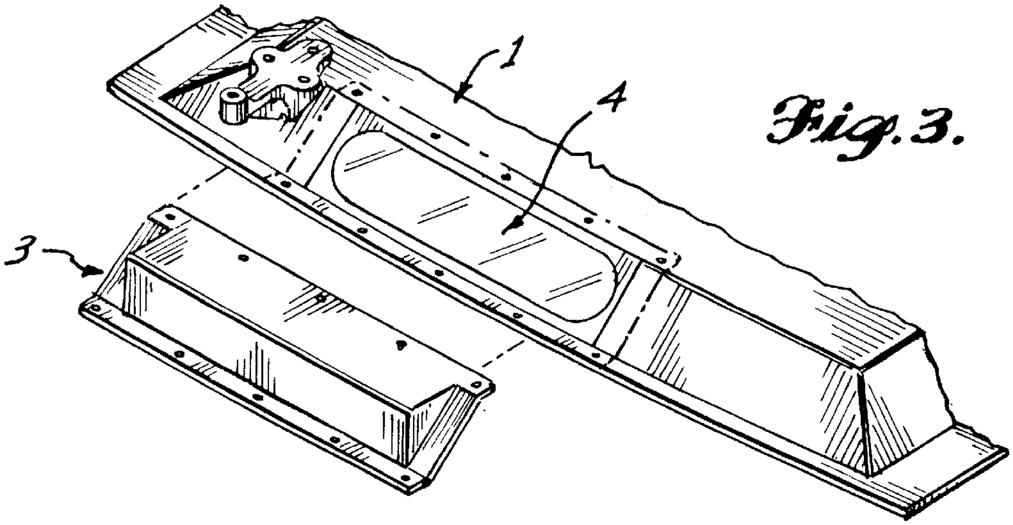
Fig. 3.

NOSE GEAR DOOR INTEGRAL COMPOSITE GLIDE SLOPE ANTENNA

This invention relates to aircraft antenna systems, and particularly to antenna systems for aircraft ILS glide slope landing systems.

BACKGROUND OF THE INVENTION

To utilize the ILS (Instrument Landing System) an aircraft must carry a glide slope antenna, which serves as the sensor for elevation guidance during the final phase of flight just prior to the flare maneuver. Conventional transport aircraft have located the glide slope antenna on the nose bulkhead under the radome, which is an electromagnetically transparent window to the 330 MHz (UHF) frequency of operation of the glide slope system. Large aircraft cannot locate a final approach glide slope antenna on the nose bulkhead, since the main landing gear will be too low as the aircraft crosses the runway threshold. The antenna must be located farther aft to keep the wheel path and glide slope antenna path closer together. An earlier patent, U.S. Pat. No. 3,662,392, issued May 9, 1972, located the glide slope antenna in the nose gear door, which was an all aluminum construction. With introduction of more advanced composite materials in aircraft to save weight, the nose gear door of the 777 is constructed of graphite/epoxy skins and aramid honeycomb core material. The present invention incorporates a glide slope antenna in an advanced composite nose gear door. The aft nose gear door antenna location has proved to be an acceptable location for providing adequate radiation pattern coverage for the glide slope system. The location is far enough forward to utilize the upward slope of fuselage to provide sufficient forward radiation pattern coverage, since the glide slope signal in space is horizontally polarized. The aircraft underside serves as a reflector or image, and the nose gear door is of sufficient size to locate the antenna an adequate distance below the fuselage to establish sufficient antenna gain, and thus provide the glide slope receiver with adequate signal strength. U.S. Pat. No. 3,868,693, issued Feb. 25, 1975, describes a flap antenna intended for microwave application, where the wavelength is such that the antenna does not illuminate the aircraft surface. The antenna, according to the present invention, has a wavelength on the order of one meter, and has the pattern formed by the fuselage underside. The antenna described hereinafter is a relatively low gain antenna, whereas the flap antenna is much more directive.

BRIEF DESCRIPTION OF THE PRESENT INVENTION

A glide slope antenna located on the leading edge of a nose gear door. The door is fabricated of advanced composites utilizing graphite/epoxy skins and aramid/phenolic resin paper and honeycomb core materials. The antenna is a slot element located on a fiberglass laminate part, which bolts to the door proper. The slot element is etched in copper on the inside surface of the fiberglass laminate part. The copper is formed on the part through an electro-deposition process. An integral matching unit and hybrid power divider are located inside the part using microstrip technology. An electromagnetic window on the forward edge of the door serves to couple energy from the slot into the door, thereby forming a cavity of sufficient volume to achieve a satisfactory impedance match over the required bandwidth of the glide slope system. The hybrid power divider provides two isolated output ports to drive two glide slope receivers from a single antenna, while providing sufficient isolation to prevent one coax line fault from affecting the other receiver.

BRIEF DESCRIPTION OF THE DRAWINGS

A full understanding of the invention, and its further objects and advantages, will be had from the detailed description when taken in conjunction with the accompanying drawings in which:

FIG. 1 is illustrative of the forward end of the nose gear door in perspective with the present glide slope antenna element attached to the leading edge of the door;

FIG. 2 is a cross section taken along the lines 2—2 of the antenna element of FIG. 1 as it interfaces with the leading edge of the door;

FIG. 3 is an exploded view of the door and antenna housing; and,

Figure 4:
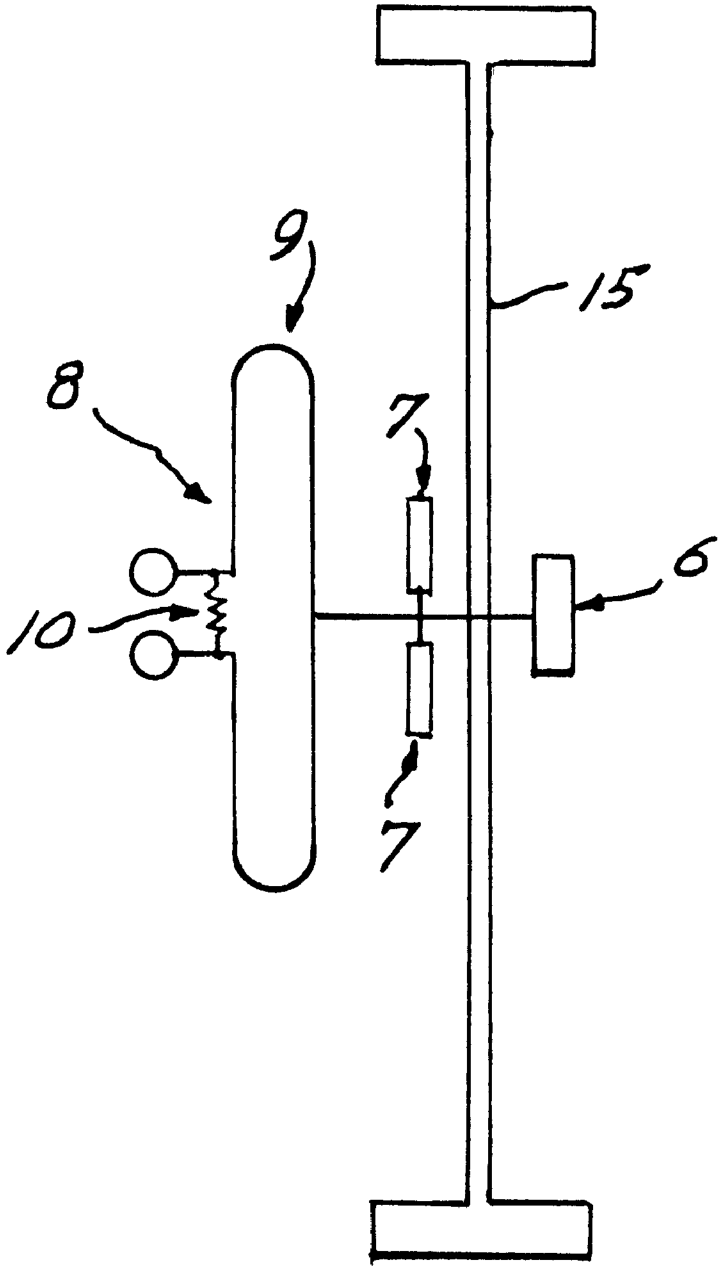
FIG. 4 is a schematic of the antenna with its matching circuitry and integral power divider.

A unique feature of the present invention is the incorporation of a glide slope antenna on the leading edge of an advanced composite aft nose gear door. The door skins 1, as shown in FIGS. 1 and 2, are constructed of graphite/epoxy which is electrically conductive. The conductivity of graphite/epoxy although several orders of magnitude below aluminum is still sufficient to act as an adequate conductor/ground plane. The core material is aramid/phenolic honeycomb 2, which is an electrical insulator and is essentially transparent to RF at the operating frequency of the glide slope system. A slot antenna requires a cavity of sufficient volume if an adequate impedance match is to be achieved over the 6 MHz bandwidth of the glide slope system (329–335 MHz). The antenna element 3, as seen in FIGS. 1–3, is positioned on the door with the door providing the attaching holes. However, the antenna housing itself cannot provide sufficient cavity volume for a UHF slot element, and therefore a portion of the volume of the door is used for this purpose. To couple electromagnetic energy from the back side of the slot into the door, a special electromagnetic window 4 was located on the forward ramp face of the door directly behind the antenna element. Window 4 was formed by omitting the graphite/epoxy locally on the ramp and substituting epoxy fiberglass cloth which is a dielectric. Window 4 provides electromagnetic access to the natural cavity formed by the construction of the door. The door dimension is such that it can propagate a waveguide mode. To provide a controlled cavity volume shorting posts in the form of conducting bolts 5 are located a fraction of a wavelength from the leading edge of the door. From waveguide theory it can be observed that conducting bolts 5 will provide the equivalent circuit of an inductor located a given distance from the aperture. Each bolt 5 has its own equivalent inductance but together they form an equivalent inductor spaced a fraction of a guided wavelength from the aperture. This impedance is then paralleled with the impedance of window 4 which is electromagnetically an iris. Thus, this combination is seen by the aft side of slot element 15.

The net effect is that slot element 15 (as seen in the schematic of FIG. 4) can be matched using a two element circuit composed of a series capacitor 6 at the center of slot element 15 paralleled by pair of second capacitor 7. The implementation of the capacitors 7 is in the form of microstrip elements. Laboratory measurements have shown this circuitry to yield a VSWR less than 5:1 over the glide slope band, which is sufficient for a receive glide slope antenna. The antenna element also includes an integral hybrid power divider 8 providing two isolated outputs to drive two glide slope receivers. The power divider is also implemented in microstrip using two-quarter wavelength 70 ohm lines 9 with a surface mounted chip 100 ohm resistor 10 at the output side of the hybrid. This hybrid serves to prevent a fault on one coax line to one receiver from affecting the signal on the other receiver.

Antenna element 3 is bolted to the door and a special conductive gasket 11, as seen in FIG. 2, provides a continuous bond around the outside periphery of the antenna element. Gasket 11 has sufficient compressibility to make up for manufacturing tolerances between the door itself and fiberglass antenna element 3. Electrically, gasket 11 serves to conduct currents from the copper on antenna 3 element to the graphite door skins.

What is claimed is:

1. A glide slope antenna disposed on the leading edge of the nose gear door of an aircraft, said glide slope antenna comprising:

a slot element disposed on a glass fiber laminate structure fastened to said nose gear door, said slot element etched in copper on an inside surface of said glass fiber laminate structure; and, an electromagnetic window disposed on the forward edge of said nose gear door for coupling radio frequency energy into said nose gear door.

2. The invention, according to claim 1, a hybrid power divider having two isolated output ports disposed inside said glass fiber laminate structure.

3. In combination with an aft nose gear door, a glide slope antenna having a housing fastened to said aft nose gear door, said glide slope antenna comprising:

a slot element having a cavity comprising said housing for said glide slope antenna; and a volume of said aft nose gear door; and, where the cavity volume is controlled by conducting bolts.

4. The combination according to claim 3 further including an electromagnetic window for coupling electromagnetic energy from the back side of said slot element into said aft nose gear door.

5. The combination according to claim 4 wherein said electromagnetic window is disposed on a forward ramp face of said aft nose gear door behind said slot element.

6. The combination according to claim 4 wherein said electromagnetic window comprises epoxy glass fiber cloth.

7. The combination according to claim 3 wherein the cavity volume is controlled by a plurality of conducting bolts.

8. The combination according to claim 3 further including a plurality of conducting bolts disposed a fraction of a wavelength from the leading edge of said aft nose gear door.

9. In combination;

a composite nose gear door;

an antenna system disposed on said composite nose gear door; and, said antenna system including an electromagnetic window disposed in said composite nose gear door.

10. In combination;

a composite door;

an antenna system disposed on said composite door;

said antenna system including an electromagnetic window disposed in said composite door; and, said antenna system including a cavity volume controlled by conducting elements.

11. In combination with an aircraft landing gear door, a glide slope antenna having a housing fastened to said aircraft landing gear door, said glide slope antenna comprising:

a slot element having a cavity comprising said housing for said glide slope antenna, and a volume of said aircraft landing gear door.

12. The combination according to claim 11 further including an electromagnetic window for coupling electromagnetic energy from the back side of said slot element into said aircraft landing gear door.

13. The combination according to claim 12 wherein said electromagnetic window is disposed on a forward ramp face of said aircraft landing gear door behind said slot element.

14. The combination according to claim 12 wherein said electromagnetic window comprises epoxy glass fiber cloth.

15. The combination according to claim 11 further including a plurality of conducting bolts disposed a fraction of a wavelength from the leading edge of said aircraft landing gear door.

16. In combination:

a composite panel;

an antenna system disposed on said composite panel;

said antenna system including an electromagnetic window disposed in said composite panel; and, wherein conducting elements are utilized to control a cavity volume of said antenna system.

* * * * *